US007762636B2

United States Patent
Veeser et al.

(10) Patent No.: US 7,762,636 B2
(45) Date of Patent: Jul. 27, 2010

(54) CONTAINER STORAGE ASSEMBLY

(75) Inventors: Kevin Veeser, Casco, WI (US); Louis S. Anich, Jr., Mukwonago, WI (US)

(73) Assignee: Hatco Corporation, Milwaukee, WI (US)

( * ) Notice: Subject to any disclaimer, the term of this patent is extended or adjusted under 35 U.S.C. 154(b) by 347 days.

(21) Appl. No.: 11/839,218

(22) Filed: Aug. 15, 2007

(65) Prior Publication Data

US 2009/0045153 A1  Feb. 19, 2009

(51) Int. Cl.
A47B 88/00 (2006.01)
(52) U.S. Cl. .............................. 312/330.1; 312/334.23; 312/334.1; 312/246; 219/385; 219/392; 219/428; 99/483
(58) Field of Classification Search ................ 211/126, 211/126.1, 126.15, 10, 189, 13.1, 46, 134, 211/191; 219/385, 392, 394, 428; 312/246, 312/330.1, 334.1, 334.23, 334.7; 99/468, 99/483
See application file for complete search history.

(56) References Cited

U.S. PATENT DOCUMENTS

| 0,803,102 | A |   | 10/1905 | Harris |              |
|-----------|---|---|---------|--------|--------------|
| 2,065,116 | A | * | 12/1936 | Constantine et al. | 108/26 |
| 2,103,885 | A | * | 12/1937 | Whalen | 312/404 |
| 2,302,236 | A | * | 11/1942 | Mayne | 211/126.1 |
| 2,478,017 | A | * | 8/1949  | Shoemaker | 62/283 |
| 2,825,617 | A | * | 3/1958  | Morgan | 312/351 |
| 2,948,798 | A |   | 8/1960  | Ness |              |
| 3,490,823 | A | * | 1/1970  | Bardeau et al. | 312/270.3 |
| 3,655,063 | A | * | 4/1972  | Landry | 211/41.2 |
| 3,804,330 | A | * | 4/1974  | Miller et al. | 239/34 |
| 3,868,123 | A |   | 2/1975  | Berg et al. |    |
| 3,895,215 | A |   | 7/1975  | Gordon |         |
| 3,963,125 | A | * | 6/1976  | Baggott | 211/126.15 |
| 5,505,122 | A | * | 4/1996  | Gerrit | 99/476 |
| 5,806,333 | A | * | 9/1998  | Kim et al. | 62/353 |
| 6,541,739 | B2 | * | 4/2003 | Shei et al. | 219/399 |
| 7,385,160 | B2 | * | 6/2008 | Jones | 219/386 |
| 2002/0121509 | A1 | * | 9/2002 | Shei et al. | 219/399 |
| 2002/0162813 | A1 | * | 11/2002 | Hall | 211/133.1 |
| 2004/0020915 | A1 | * | 2/2004 | Shei | 219/385 |
| 2006/0113293 | A1 | * | 6/2006 | Neger | 219/385 |

* cited by examiner

*Primary Examiner*—Darnell M Jayne
*Assistant Examiner*—Devin Barnett
(74) *Attorney, Agent, or Firm*—Michael Best & Friedrich LLP

(57) ABSTRACT

A container storage assembly including a frame, a first container support coupled to the frame and having a lower container support surface and an upper container support surface, and a second container support coupled to the frame and having a lower container support surface. The assembly further includes a third container support having an upper container support surface. The third container support is coupled to the frame between the first and the second container supports. The lower container support surfaces of the first container support and the second container support define a first plane, and the upper container support surfaces of the first container support and the third container support define a second plane that is above the first plane.

17 Claims, 4 Drawing Sheets

CONTAINER STORAGE ASSEMBLY

BACKGROUND

The present invention relates to container storage assemblies, and more particularly, to supports for supporting containers of container storage assemblies.

Containers, such as trays or pans, are often supported by a frame for storing the containers. Typically, channels or slides are coupled to the frame to support the containers. In one construction, two channels are coupled to opposite sides of the frame, and the channels are spaced a distance slightly less than the width of the containers. One of the containers is slid between the two opposed channels that support the container for storage. When the container is removed, the container can be pushed or pulled and the container slides along the two channels, which guide the movement of the container.

SUMMARY

In one embodiment, the present invention provides a container storage assembly including a frame and three container supports. The first container support is coupled to the frame and has a lower container support surface and an upper container support surface. The second container support is coupled to the frame and has a lower container support surface. The third container support is coupled to the frame between the first and the second container supports and has an upper container support surface. The lower container support surfaces of the first container support and the second container support define a first plane, and the upper container support surfaces of the first container support and the third container support define a second plane that is above the first plane.

In another embodiment, the invention provides a container storage assembly having a frame configured to support the container storage assembly on a surface, a first container support coupled to the frame, a second container support coupled to the frame, and a first container having a width. The first container is configured to suspend from the first and the second container supports at a first height above the surface. The assembly further includes a third container support coupled to the frame between the first and the second container supports. The third container support includes a first container support surface. The first container support surface of the third container support is at a second height above the surface, and the second height is greater than above the first height such that the third container support is above the first container when the first container suspends from the first and the second container supports. The assembly further includes a second container having a width less than the width of the first container. The second container is configured to suspend from the first and the third container supports at the second height.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

The illustrated container storage assembly 10 is a food warmer that is operable to heat food or keep food at a relatively warm temperature. In other embodiments, the container storage assembly 10 can hold other items, products, materials, etc.

Figure 1:
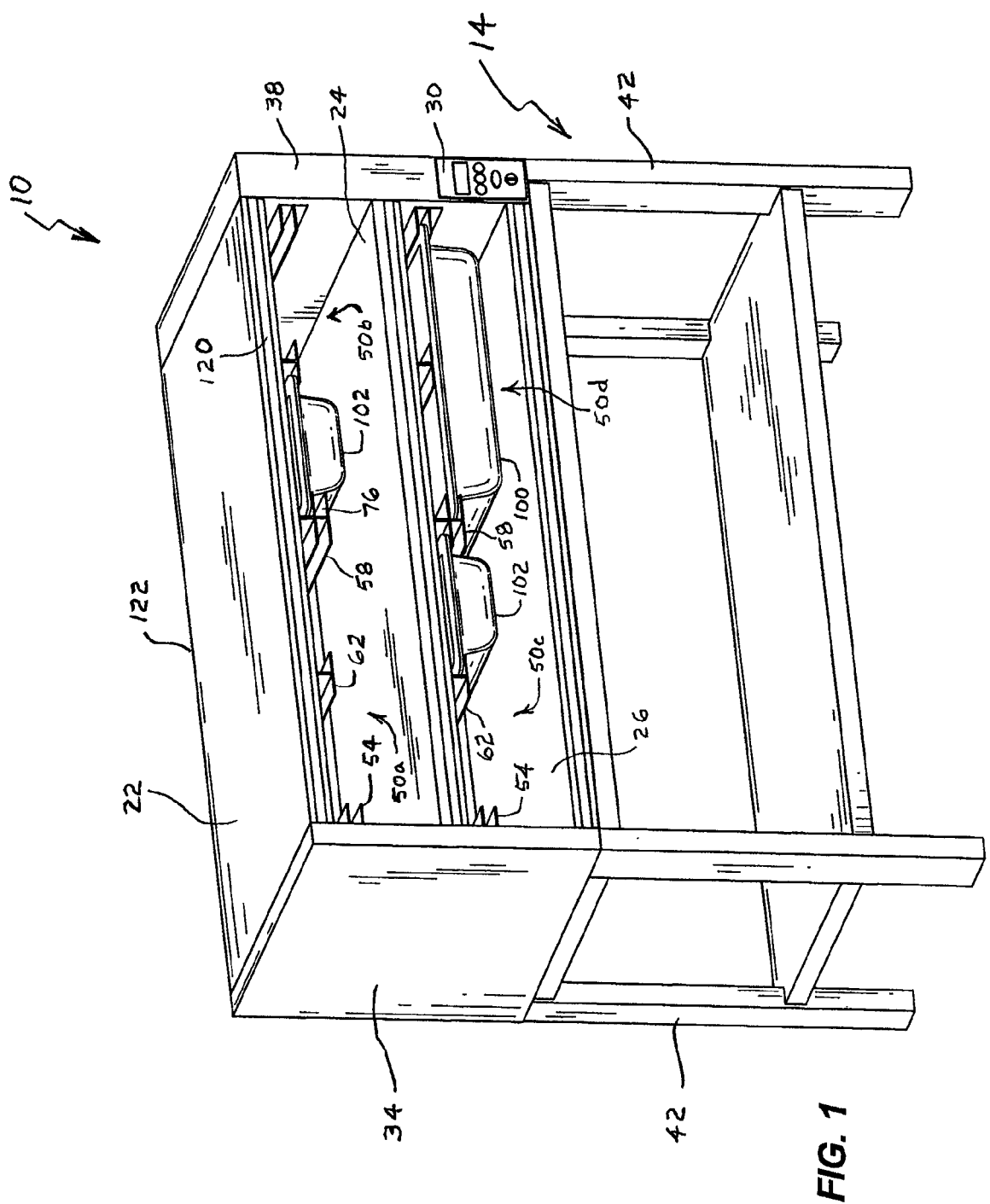
FIG. 1 is a perspective view of a container storage assembly embodying the present invention.
Figure 2:
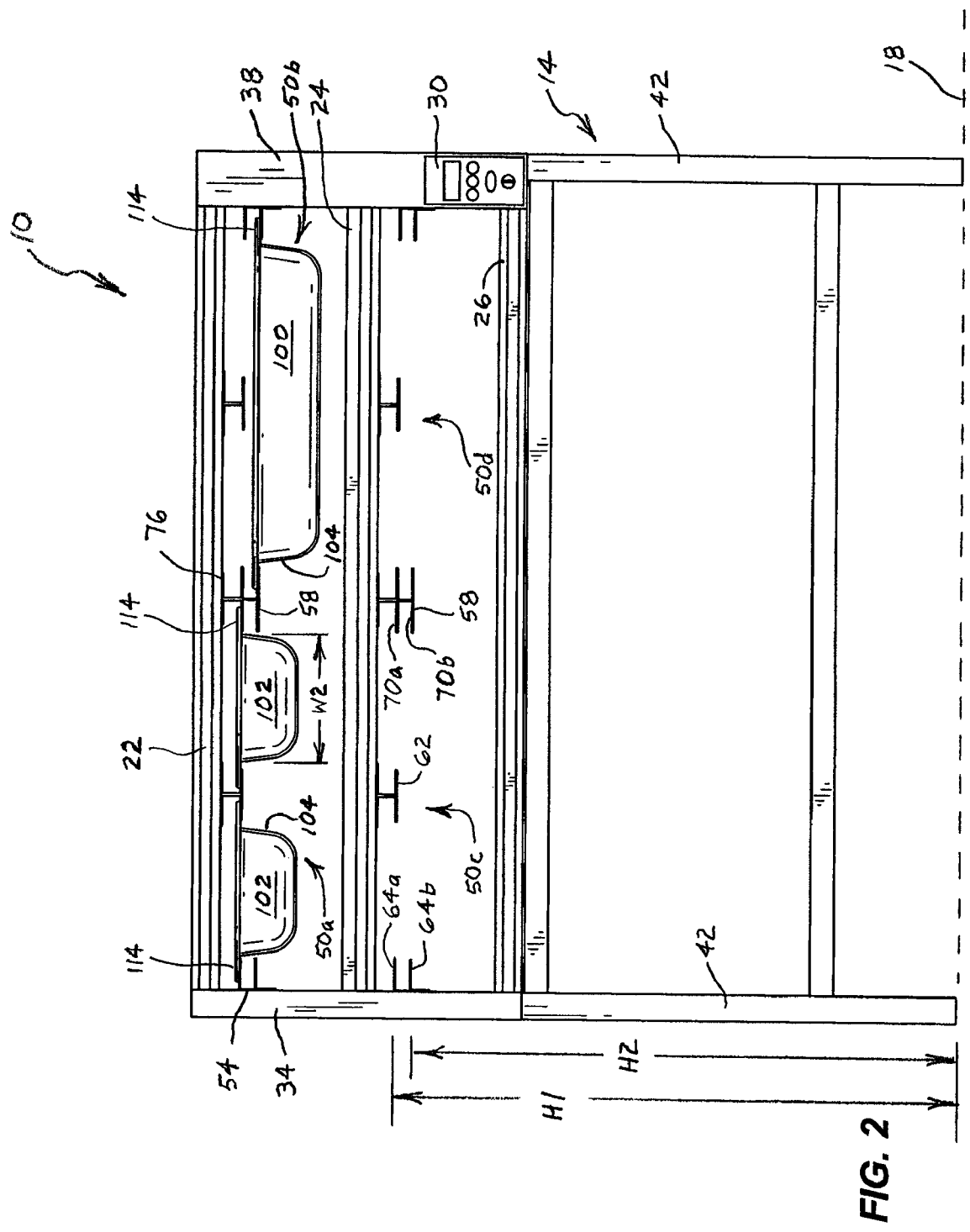
FIG. 2 is a front side view of the container storage assembly of FIG. 1.

Referring to FIGS. 1 and 2, the container storage assembly 10 includes a frame 14 that supports the container storage assembly 10 above a support surface 18. The frame 14 includes an upper shelf 22, a middle shelf 24, and a lower shelf 26. The shelves 22, 24, 26 are generally parallel to the support surface 18 and are supported by left and right side panels 34, 38 of the frame 14 and vertical supports 42 of the frame 14. As is understood in the art, because the illustrated assembly 10 is a food warmer, the shelves 22, 24, 26 can include a heating element, such as a radiant-type heating element, which is controlled by a control panel 30.

The container storage assembly 10 further includes four container support assemblies 50a, 50b, 50c, and 50d coupled to the frame 14. While the illustrated container storage assembly 10 includes the four support assemblies 50a, 50b, 50c, and 50d, in other constructions the container storage assembly can include more or less than four container support assemblies. Each of the illustrated support assemblies 50a, 50b, 50c, and 50d is substantially the same, and therefore only one support assembly 50c will be described in detail below and like components have been given like reference numbers.

Figure 3:
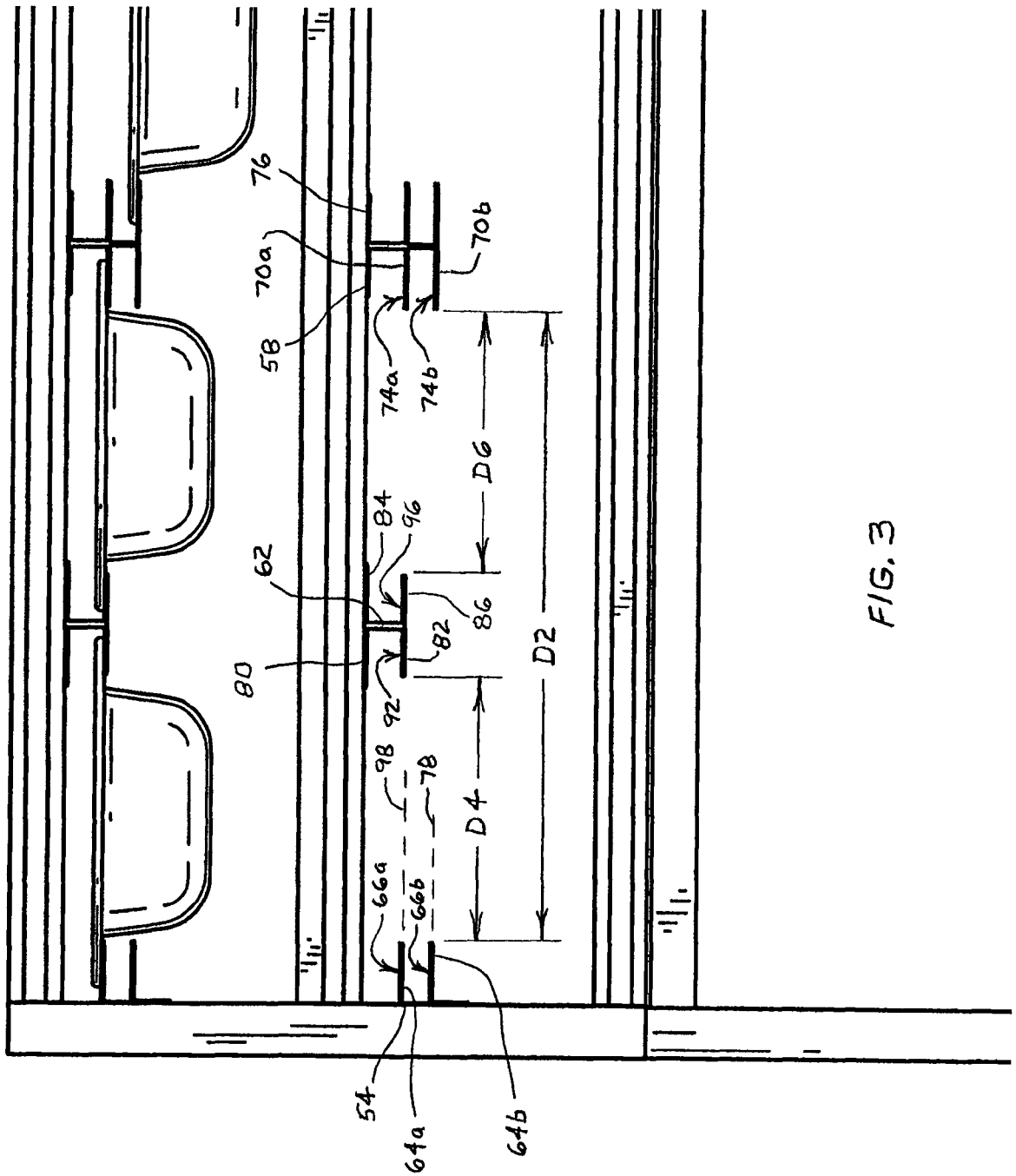
FIG. 3 is an enlarged view of a portion of FIG. 2.

Referring to FIGS. 2 and 3, the container support assembly 50c includes a first outer container support 54, a second outer container support 58, and a third or middle container support 62. The first outer support 54 is formed from an F-shaped channel having an upper flange 64a and a lower flange 64b. The upper flange 64a defines an upper container support surface 66a and the lower flange 64b defines a lower container support surface 66b. The upper container support surface 66a is located a height H1 above the support surface 18 and the lower container support surface 66b is located a height H2 above the support surface 18 and beneath the upper support surface 66a.

The illustrated second outer container support 58 is formed from an E-shaped channel having an upper flange 70a and a lower flange 70b. The upper flange 70a defines an upper container support surface 74a and the lower flange 70b defines a lower container support surface 74b. In the illustrated construction, the upper container support surface 74a is located at the height H1 above the support surface 18, and the lower container support surface 74b is located at the height H2 above the support surface 18 and beneath the upper support surface 74a. As seen in FIG. 2, the second outer container support 58 is back-to-back with an identical container support 76, which is used to support an adjacent container.

The first and second outer container supports 54 and 58 are coupled to the frame 14 of the container storage assembly 10 such that the lower support surfaces 66b, 74b are co-planar and define a first or lower container support plane 78. Also, the first and second container supports 54 and 58 are coupled to the frame 14 such that the flanges 64a, 64b of the first support 54 and the flanges 70a, 70b of the second support 58 are separated by a distance D2. While the illustrated outer container supports 54 and 58 are each integrally formed as a single piece, it should be understood that, in other constructions, the outer container supports can each be formed from multiple components. For example, in one such construction, the outer support 54 can be formed from two separate components, one component including the upper flange 64a and a second component including the lower flange 64b. These components including the flanges 64a and 64b can either be directly coupled to each other or they can be spaced from one another.

The third or middle container support 62 is coupled to the frame 14 between the first and the second outer container supports 54 and 58. In the illustrated construction, the middle container support 62 is coupled to the frame 14 halfway between the first and second outer container supports 54 and 58. In other constructions, the middle support 62 can be offset closer to one of the outer supports 54 or 58.

The illustrated middle support 62 is formed from a first U-shaped channel 80 having an upper flange 82 and a second U-shaped channel 84 having an upper flange 86. The upper flange 82 of the first U-shaped channel 80 is coupled to the frame 14 a distance D4 from the upper flange 64a of the first outer support 54, and the upper flange 86 of the second U-shaped channel 84 is coupled to the frame 14 a distance D6 from the upper flange 70a of the second outer container support 58. While the distances D4 and D6 are equal in the illustrated construction, the distances D4 and D6 may not be equal in other constructions (i.e., the middle support 62 can be offset closer to one of the outer supports 54, 58).

The upper flange 82 of the first U-shaped channel 80 defines a first upper container support surface 92 and the upper flange 86 of the second U-shaped channel 84 defines a second upper container support 96. In the illustrated embodiment, the first and second U-shaped channels 80 and 84 are directly coupled to each other in a back-to-back orientation. In other embodiments, the flanges 82, 86 can be separated a distance. Also, while the illustrated middle support 62 includes two container support surfaces 92 and 96, in other constructions, the middle container support can include one or more than two container support surfaces.

The upper flanges 82, 86 of the middle support 62 are both the distance H1 above the support surface 18. Therefore, the upper support surfaces 92, 96 of the middle support 62 are co-planer with the upper support surfaces 66a, 74a of the outer supports 54, 58. Together, the support surfaces 66a, 74a, 92, 96 define a second or upper container support plane 98. As shown in FIG. 2a, the upper container support plane 98 is above the lower container support plane 78, and in one construction, the upper container support plane 98 is less than six inches above the lower container support plane 78, and in yet other constructions, the upper container support plane 98 is less than three inches above the lower container support plane 78. While in the illustrated construction, the support surfaces 66a, 74a, 92, 96 are all co-planer, in other constructions, the support surfaces 66a and 92 can form a first plane that is offset from support surfaces 74a and 96 that form a second plane.

In one construction, the container supports 54, 58, 62 are formed from metal, such as aluminum, stainless steel, sheet metal, and the like. In other constructions, other suitable materials can be utilized, such as plastics, composites, etc.

Figure 4:
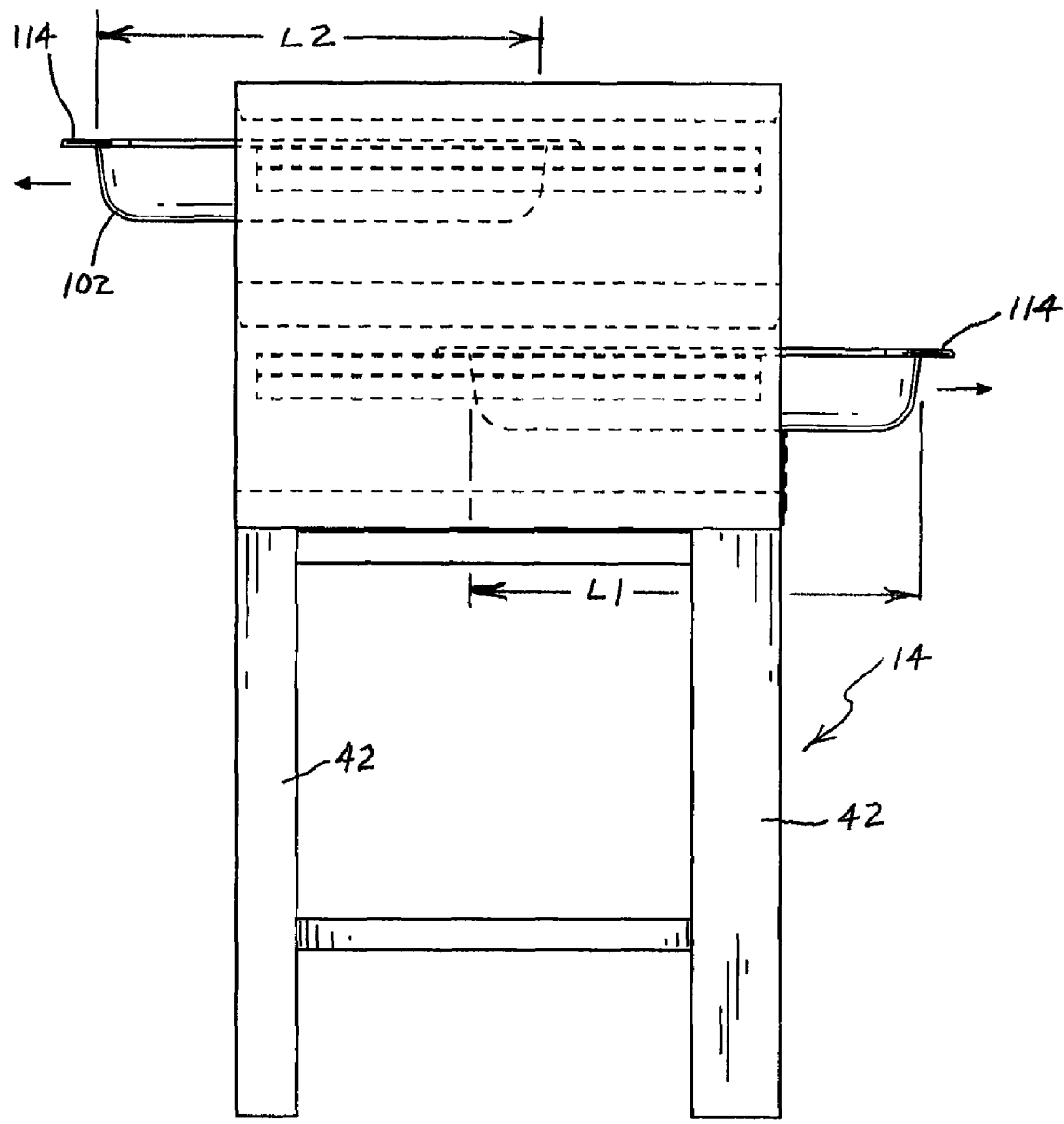
FIG. 4 is a left side view of the container storage assembly of FIG. 1.

Referring to FIGS. 2 and 4, the container storage assembly 10 is designed to accommodate a first or wide container 100 and narrow containers 102. In the illustrated construction, the containers 100, 102 are pans. In the other constructions, the containers can be any suitable container such as trays, plates, etc. As will be discussed in more detail below, while the illustrate assembly 10 includes two narrow containers 102 and one wide container 100, the assembly 10 can include any suitable number or combination of wide and narrow containers.

The illustrated containers 100, 102 each include sidewalls 104 that define a cavity for holding food or other suitable products, items, etc. Each of the illustrated containers 100, 102 further include a flange 114 that extends from the upper end of the sidewalls 104. The sidewalls 104 of the wide container 10 define a length L1 and a width W1 of the wide container 100. The sidewalls 104 of the narrow container 102 define a length L2 and a width W2 of the narrow container 102. While each of the illustrated narrow containers 102 has the same width W2, in other constructions, the widths of the narrow containers 102 may not be equal.

In the illustrated construction, the width W2 of each of the narrow containers 102 is about 40 percent of the width W1 of the wide container 100. Therefore, the total width of the narrow containers 102, W2 plus W2, is less than the width of the wide container 100.

Referring to FIGS. 2 and 3, the container support assembly 50c can be utilized to support either the wide container 100 or up to two narrow containers 102. Referring to the container support assembly 50a of FIG. 2, one of the narrow containers 102 can be suspended from the upper container support surface 66a of the first outer support 54 and the first upper container support surface 92 of the middle container support 62 at the upper height H1. Likewise, another narrow container 102 can be suspended from the upper container support surface 74a of the second outer support 58 and the second upper support surface 96 of the middle support 62 at the upper height H1. Alternatively, referring to the container support assembly 50b of FIG. 2, the container support assembly can be utilized to support the wide container 100 at the lower height H2. To support the wide container 100, the container 100 is suspended from the lower container support surface 66b of the first outer support 54 and the lower container support surface 74b of the second outer support 58. With the wide container 100 supported by the outer supports 54, 58 the middle support 62 is above the wide container 100, thereby allowing the wide container 100 to slide along the supports 54, 58, as illustrated in FIG. 4.

Referring to FIGS. 2-4 the containers 100, 102 are supported by the container supports 54, 58, 62 by suspending the containers 100, 102 using the flanges 114. The flanges 114 are supported by the supports surfaces 66a, 66b, 74a, 74b, 92, 96 and the flanges 114 can slide along the supports surfaces 66a, 66b, 74a, 74b, 92, 96 for access to the cavities of the containers 100, 102. As illustrated in FIG. 4, the container storage assembly 10 is open at a front end 120 and a rear end 122 of the frame 14 such that the containers 100, 102 can be accessed from either end 120, 122 for placing items into or removing items from the containers 100, 102.

While the invention has been described for use with a container storage assembly food warmer, it should be understood that the invention can be practiced with any container storage assembly that holds or stores any suitable item, product, etc.

Various features and advantages of the invention are set forth in the following claims.

What is claimed is:

1. A container storage assembly comprising:
   a frame;
   a first container support coupled to the frame and having a lower container support surface and an upper container support surface;
   a second container support coupled to the frame and having a lower container support surface and an upper container support surface;
   a third container support having a first upper container support surface and a second upper container support surface, the third container support coupled to the frame between the first and the second container supports;
   wherein the lower container support surfaces of the first container support and the second container support define a first plane, the lower container support surfaces spaced apart from each other and configured to support opposing sides of a first container,
   wherein the upper container support surface of the first container support and the first upper container support surface of the third container support define a second plane, the upper container support surface of the first container support and the first upper container support surface spaced apart from each other and configured to support opposing sides of a second container,
   wherein the upper container support surface of the second container support and the second upper container support surface of the third container support define a third plane, the upper container support surface of the second container support and the second upper container support surface spaced apart from each other and configured to support opposing sides of a third container, and
   wherein the second plane is above the first plane such that the first container support and the second container support are adapted to support the first container below the third container support on the lower container support surfaces.

2. The container storage assembly of claim 1, wherein the second and the third planes are co-planar.

3. The container storage assembly of claim 1, wherein the first, the second, and the third container supports each include a channel, wherein the channel of the first container support defines the upper and the lower support surfaces of the first container support, wherein the channel of the second container support defines the upper and the lower support surfaces of the second container support, wherein the channel of the third container support defines the first upper container support surface of the third container support, and wherein the third container support further includes a second channel that defines the second upper container support surface of the third container support.

4. The container storage assembly of claim 3, wherein the first and the second channels of the third container support are directly coupled together.

5. The container storage assembly of claim 1, further comprising:
   a first container having a width, the first container configured to suspend from and slide along the lower support surface of the first container support and the lower support surface of the second container support; and
   a second container having a width less than the width of the first container, the second container configured to suspend from and slide along the upper support surface of the first container support and the first upper container support surface of the third container support.

6. The container storage assembly of claim 5, wherein the first container includes sidewalls that define a cavity, the first container further including a flange that extends from the sidewalls, and wherein the flange is configured to suspend the first container from the lower support surface of the first container support and the lower support surface of the second container support.

7. The container storage assembly of claim 5, wherein the width of the second container is less than about 75 percent of the width of the first container.

8. The container storage assembly of claim 1, wherein the second plane is less than 6 inches above the first plane.

9. The container storage assembly of claim 7, wherein the second plane is less than about 3 inches above the first plane.

10. The container storage assembly of claim 1, wherein the upper and lower container support surfaces of the first container support are integrally formed as a single piece.

11. A container storage assembly comprising:
    a frame configured to support the container storage assembly on a base surface;
    a first container support coupled to the frame;
    a second container support coupled to the frame;
    a first container having a width, the first container configured to suspend from the first and the second container supports at a first height above the base surface;
    a third container support coupled to the frame between the first and the second container supports, the third container support having a first container support surface and a second container support surface, the first container support surface and the second container support surface of the third container support each being at a second height above the base surface, the second height greater than the first height such that the third container support is above the first container when the first container suspends from the first and the second container supports;
    a second container having a width less than the width of the first container, the second container configured to suspend from the first and the third container supports at the second height; and
    a third container having a width less than the width of the first container, the third container configured to suspend from the second and the third container supports at the second height.

12. The container storage assembly of claim 11, wherein the width of the second container is substantially equal to the width of the third container.

13. The container storage assembly of claim 11, wherein a total width is defined as the width of the second container plus the width of the third container, wherein the total width is equal to or less than the width of the first container.

14. The container storage assembly of claim 11, wherein, when the first container suspends from the first and the second container supports, the second container is unable to be suspended from the first and the third container supports, and the third container is unable to be suspended from the second and third container supports.

15. The container storage assembly of claim 11, wherein the second height is less than 6 inches above the first height.

16. The container storage assembly of claim 11, wherein the second height is less than 3 inches above the first height.

17. The container storage assembly of claim 11, wherein the first container includes sidewalls that define a cavity, the first container further including a flange that extends from the sidewalls, the flange of the first container configured to slide along the first and the second container supports, wherein the second container includes sidewalls that define a cavity, the second container further including a flange that extends from the sidewalls of the second container, the flange of the second container configured to slide along the first and the third container supports.

* * * * *